Sept. 16, 1969  J. R. ROSHON ET AL  3,466,924

PRESSURE VESSEL FOR CALIBRATING SONAR TRANSDUCERS

Filed Dec. 22, 1966

INVENTORS
JOHN R. ROSHON
CHARLES E. GREEN
BY
ATTORNEYS 3,466,924
PRESSURE VESSEL FOR CALIBRATING
SONAR TRANSDUCERS
John R. Roshon, El Cajon, and Charles E. Green, San Diego, Calif., assignors to the United States of America as represented by the Secretary of the Navy
Filed Dec. 22, 1966, Ser. No. 605,521
Int. Cl. G01l 27/00
U.S. Cl. 73—1                                     3 Claims

ABSTRACT OF THE DISCLOSURE

A pressure vessel, with walls transparent to acoustic compressional waves and of sufficient strength to withstand the deep submergence pressures, contains the transducer to be tested.

---

The invention described herein may be manufactured and used by or for the Government of the United States of America for governmental purposes without the payment of any royalties thereon or therefor.

BACKGROUND

The sea environment is particularly unfriendly in which to test sonar transducers. In addition to the turbulence on the surface, there is the very difficult problem of subjecting the transducer to the necessary high hydrostatic pressures without long cables and leads.

The object of this invention therefore is to provide a testing method and apparatus which will simulate deep sea submergence and yet preserve controlled laboratory conditions.

SUMMARY

Underwater transducers are tested at deep submergence pressures and under free space conditions by placing the transducer in an acoustically transparent vessel, flooding the vessel with water and then increasing the vessel internal pressure to represent the desired depth and then exercising the transducer vessel assembly in an anechoic pool. High pressure signal leads extend through the wall of the vessel.

DESCRIPTION

Figure 1:
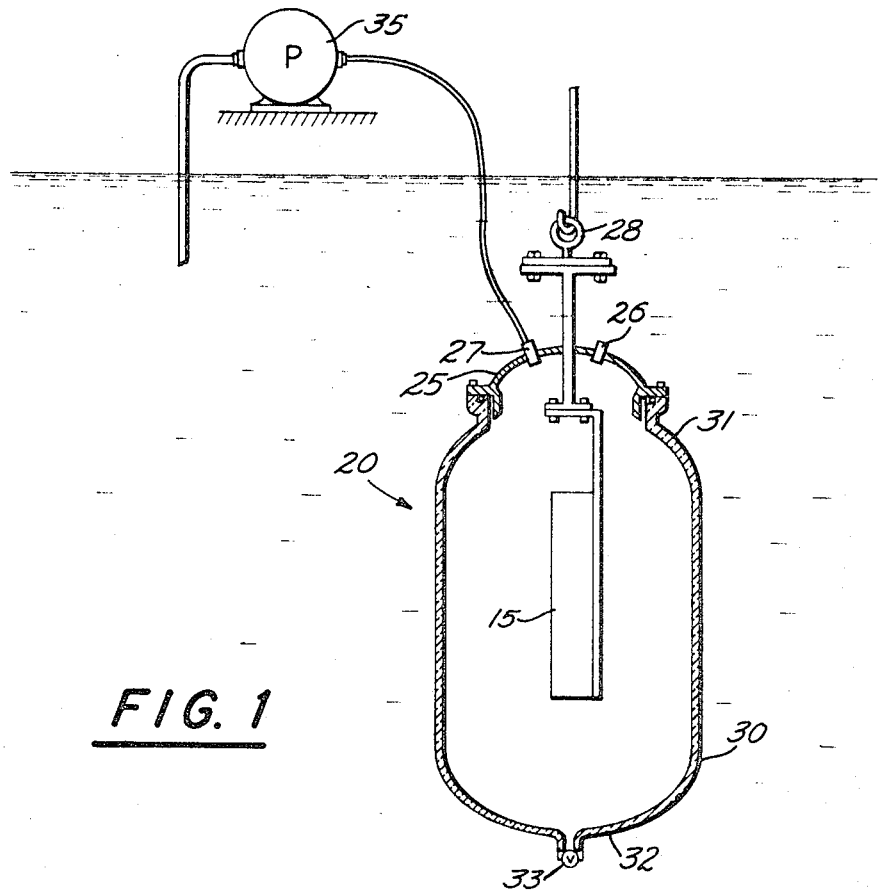
Figure 2:
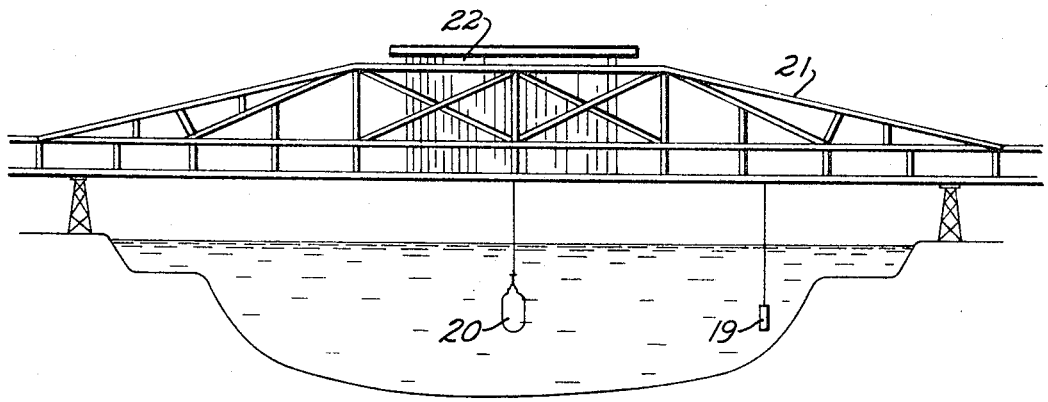

The preferred embodiment may be best understood by referring to the following description taken in connection with the accompanying drawing in which:

FIG. 1 is an elevational view in section showing the pressure vessel of this invention; and FIG. 2 is a sectional view of an anechoic pool containing the pressure vessel of FIG. 1.

The anechoic pool shown in FIG. 2, described in described in detail in the United States Patent to Green, Patent No. 3,137,362, issued June 16, 1964, is the type of pool well adapted to this invention. The pool is filled to depth of about 38 feet with either fresh or salt water and the bridge 21, about 205 feet long, is placed across the center of the pool from which transducers may be lowered into the pool. In the center of the pool is shown a pressure vessel 20 containing the transducer to be tested. Housing 22 for instruments and operators is provided. A second transducer 19 which transmits or receives in cooperation with the transducer under test is spaced a measured distance from transducer 20. Since the walls of the tank are elliptical in contour and elliptic centers are above the water no reflections or echoes can be received at either transducer under test. Hence, the transducer under test is effectively in limitless space as far as reverberation is concerned.

The pressure vessel 20, shown in greater detail in FIG. 1, comprises a cylinder 30 with elliptical end sections 31 and 32. Fiber glass-consolidated resin can be built up to the requisite wall thickness and yet remain acoustically transparent. A geodesic winding pattern minimizes the amount of fiber glass required. The radial strength of the vessel is increased by a cylindrically wound additional layer. With a wall thickness of a fraction of an inch the wall has been found to have a breaking strength of several thousand pounds per square inch. A vessel with a fiber glass wall ⅜ inch thick has been found to have a safe operating pressure of over 800 per square inch, and with ⅝ inch thickness the operating pressure without danger is 2000 per square inch. Preferably the consolidated windings on the cylinder are vacuum cured to reduce air entrapment.

The large opening in the upper end of the vessel is closed by a strong steel ribbed cap 25, removeably attached to the rim of the vessel with bolts of high tensile strength. In the cap are high pressure lead-in bushings 26 for lead-in conductors and a high pressure fitting 27 for a liquid conduit. Centrally in the cap is a heavy steel yoke 2B for supporting the transducer 15 under tests. Derrick structure, not shown, is preferred for lowering the transducer into the vessel.

One pressure vessel found to be particularly effective for rapidly testing transducers was 30 inches in diameter, has an opening 22 inches in diameter and receives transducers 36 inches long. Electrical leads were coupled to the watertight connectors 26 and connected to drivers and calibration equipment, not shown. A high pressure solenoid valve 33 was installed at the lower end of the vessel to permit filling or draining of the vessel as it is lowered into or raised out of the anechoic pool. Pressure release is provided by threaded bolts of tensile strength which will strip at some pressures less than the rupture pressure of the vessel. In case of failure the threads on the bolts will strip and the water will escape through the slit between the lid and the bead on the vessel. The high pressure pump 35 preferably of the reciprocating short-stroke type is provided for pressuring the vessel to the desired "depth" after it is filled through check valve 33. In the vessel mentioned above the pressure was raised repeatedly to 800 pounds per square inch with success. With the set-up of FIG. 2 the transducers were tested under laboratory-controlled conditions and yet were made to operate at extreme pressures.

The fact that the transducer is substantially "blind" to the walls of the enclosing vessel provided the same response characteristics as if the transducer had been submerged in the ocean to great depths. At 800 per square inch, the depth of submergence is 1800 feet. By lowering the inflated vessel below the surface of the anechoic pool the test transducer responses as though it were in limitless space.

Obviously many modifications and variations of the present invention are possible in the light of the above teachings.

We claim:

1. The method of testing transducers at simulated deep-submergence comprising;
    enclosing the transducer to be tested in a liquid tight vessel having a wall transparent to the compressional waves to be utilized by the transducer,
    filling said vessel with liquid,
    connecting sonar transmitting or receiving means to said transducer,
    submerging said vessel and transducer in a pool of water, submerging in said pool remote from said liquid tight vessel a second transducer, and operating the two mentioned transducers in cooperative relation, increasing the hydrostatic pressure, by a pump, in said vessel to a value representative of a predetermined dept of submergence, and exercising said transducers while said vessel is maintained at said pressure.

2. In combination in a deep-submergence transducer test system;

a vessel having a cylindrical section with spherical end sections, a removable closure plate, and wall material having high strength and high transmissibility of compressional sound waves, a bracket on said closure plate for supporting the transducer to be tested, insulating bushings in said plate for lead-in conductors to said transducer, a high pressure pump coupled to said vessel for inflating said vessel with a pressure of the order of 800 pounds per square inch.

3. In the vessel of the system defined in claim 2 comprising said cylindrical and spherical end sections;

said sections being fabricated of fiber glass consolidated with resin of high tensile strength and high transmissibility of acoustic compressional waves.

References Cited

UNITED STATES PATENTS

| | | | |
|---|---|---|---|
| 2,999,225 | 9/1961 | Gregg, Jr., et al. | 73—1 XR |
| 3,098,211 | 7/1963 | Gerber | 73—1 XR |
| 3,137,362 | 6/1964 | Green | 181—.5 |
| 3,162,051 | 12/1964 | Peters | 73—431 |
| 3,224,246 | 12/1965 | Schloss et al. | 73—1 |
| 3,292,142 | 12/1966 | Carson | 73—1 |
| 3,333,236 | 7/1967 | Schloss | 73—1 XR |

LOUIS R. PRINCE, Primary Examiner

HARRY C. POST III, Assistant Examiner

U.S. Cl. X.R.

340—8